UNITED STATES PATENT OFFICE.

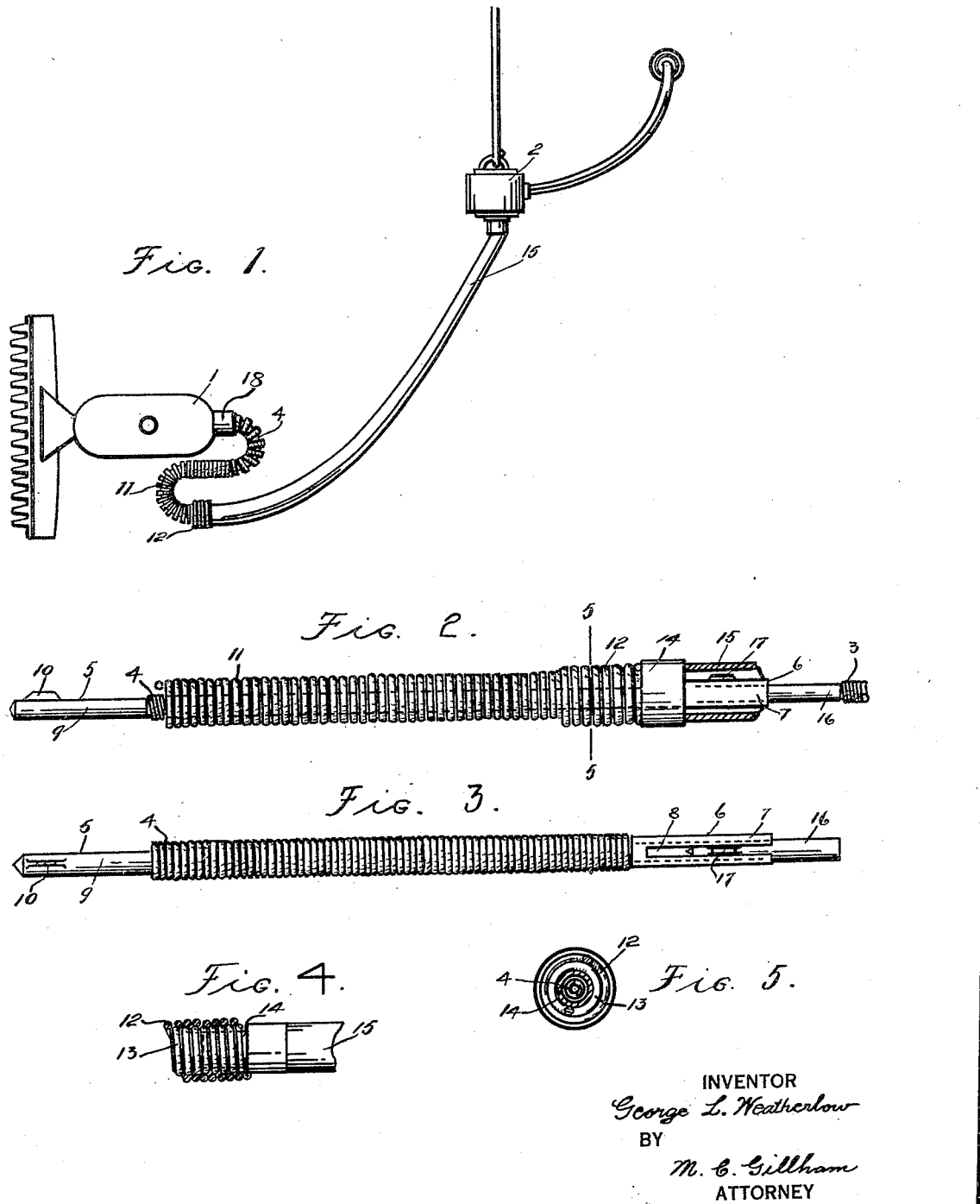
G. L. WEATHERLOW.
FLEXIBLE COUPLING FOR FLEXIBLE SHAFTS.
APPLICATION FILED FEB. 11, 1921.
1,402,981. Patented Jan. 10, 1922.
INVENTOR
George L. Weatherlow
BY
M. C. Gillham
ATTORNEY

GEORGE L. WEATHERLOW, OF KANSAS CITY, MISSOURI.

FLEXIBLE COUPLING FOR FLEXIBLE SHAFTS.

1,402,981.         Specification of Letters Patent.    Patented Jan. 10, 1922.

Application filed February 11, 1921. Serial No. 444,274.

*To all whom it may concern:*

Be it known that I, GEORGE L. WEATHERLOW, a citizen of the United States, residing at Kansas City, in the county of Jackson and State of Missouri, have invented a new and useful Flexible Coupling for Flexible Shafts, of which the following is a specification.

My invention relates to flexible couplings for flexible shafts, and particularly to a device of this character which is used to couple flexible driving shafts with the mechanism to be driven thereby.

It is my experience, that the flexible shaft and its housing as generally arranged, is not sufficiently flexible at the coupling of the shaft with the mechanism driven thereby, to allow flexing of the shaft to a degree required, for instance, in barbers' clipping machines, to operate the clipping machine at various angles relative to the flexible driving shaft. The flexing of the shaft being limited by the low flexibility of its housing, the barber cannot operate the machine to advantage in clipping hair because parts are inaccessible to the machine, such as the neck and sides of the head. Efforts of operators to bend the shaft and its housing to negotiate the places mentioned, frequently breaks the shaft housing at the connection with the machine.

The object of the invention is to provide a superflexible coupling comprising a detachable flexible shaft section which is housed in a spiral wire housing adapted for adjustably connecting the flexible driving shaft with the mechanism driven thereby.

I attain these objects and advantages by means of the combination and arrangement of parts illustrated in the accompanying drawing in which Figure 1, is a view of a clipping machine operated by a flexible shaft, and showing my invention coupled therewith. Figure 2, is a side view of the coupling embodying my invention, and showing the same coupled with the flexible shaft and its housing. Figure 3, is a side view of the flexible shaft section, a part of my invention. Figure 4, is a view, partly sectioned, of the flexible shaft housing, and showing the ferrule thereon for adjustably receiving the housing of the flexible shaft section, and, Figure 5, is a cross section of the flexible coupling, on the line 5—5, in Figure 2.

Similar numerals of reference refer to corresponding parts throughout the several views.

Referring to the drawings—the numeral 1, designates a barber's clipping machine which is driven by a motor 2, by means of a flexible shaft 3. The flexible coupling consists of a spiral wire shaft section 4, provided at one end with an actuating member 5, which is adapted for connecting with the driving element of the machine, and on the other end of the shaft section is a member 6, which is adapted for receiving the flexible shaft 3. The member 6, is a barrel 7, having a longitudinally extending slot 8, therein, and the member 5, is a pin 9, having a cog 10, and which is arranged to enter the barrel of a member similar to member 6, but associated with the machine. Over the shaft section 4, is a spiral wire housing 11, of suitable diameter to loosely receive the shaft section, the inner end portion 12 of the housing is specially arranged to engage with a screw motion, a spiral wire ferrule 13, which is mounted on a nipple 14, on the end of the flexible shaft housing 15. On the end of the flexible shaft is a coupling member 16, provided with a cog 17, which member is the usual actuating device for actuating the machine with which it is connected.

The flexible coupling embodying my invention is an attachment which may be readily applied and used to connect flexible shafts with the mechanism to be driven thereby. The ferrule 13, is first mounted on the nipple 14, on the flexible driving shaft 3, and the large end 12, of the spiral wire housing 11, is mounted thereon, with a screw motion, and the other end of the housing is entered in the nipple 18, of the clipping machine, by winding the spiral housing to contract the end portion and then entering the contracted portion in the nipple, when the spiral is released it will react and press with a suitable degree of friction, on the wall of the nipple and hold the machine assembled therewith. Before the housing is mounted, the flexible shaft section 4, is entered through the nipple 18, so that the actuating member 5, thereon will properly engage and actuate the mechanism when the flexible shaft proper is driven. When the assembly of the parts is accomplished, the spiral wire housing 11, is turned forward or backward on the spiral wire ferrule 13, to obtain the proper adjustment of the shaft section 4, of the coupling with the operating parts of the machine. The facility for the adjustment mentioned, together with the great flexibility of the coupling device, allows the operator of the machine to direct the clippers through angles and curves, and without injury or damage to the driving shaft or its housing. In Figure 1, is shown the flexible coupling flexed to describe a compound curve and which is not possible in the case of ordinary flexible shafts. The great flexibility of the flexible coupling allows the barbers' clipping machine to perform more accurately and with precision, moreover, the machine may be operated with ease at any place about the neck or head of the patron and effect a straight or flaring clipping of the hair.

Having described my invention what I claim is—

In a flexible coupling for flexible shafts, the combination with a flexible driving shaft having a housing and a mechanism driven by the flexible shaft, of a wire spiral shaft section provided at its one end with a coupling member adapted for engaging the flexible drive shaft and at its opposite end with a coupling member adapted for engaging and driving the mechanism, a wire spiral frictionally mounted on the flexible driving shaft housing, and a flexible wire spiral arranged to house said flexible shaft section and having its one end portion adjustably mounted on said wire spiral and its opposite end portion frictionally combined with the housing of the mechanism.

Dated, Kansas City, Mo., February 7th, 1921.

GEORGE L. WEATHERLOW.

Witnesses:
HENRY STUBENRAUCH,
JOHN E. HOFFMAN.